(12) United States Patent
Eavenson, Sr.

(10) Patent No.: US 7,913,479 B2
(45) Date of Patent: Mar. 29, 2011

(54) TWO-PULLEY BELT TENSIONING MECHANISM

(75) Inventor: Jimmy N. Eavenson, Sr., Aurora, OH (US)

(73) Assignee: MTD Products Inc, Valley City, OH (US)

( * ) Notice: Subject to any disclaimer, the term of this patent is extended or adjusted under 35 U.S.C. 154(b) by 307 days.

(21) Appl. No.: 12/151,555

(22) Filed: May 7, 2008

(65) Prior Publication Data

US 2008/0302075 A1 Dec. 11, 2008

Related U.S. Application Data

(60) Provisional application No. 60/933,740, filed on Jun. 8, 2007.

(51) Int. Cl.
*A01D 69/08* (2006.01)

(52) U.S. Cl. .......................... 56/11.6; 474/135

(58) Field of Classification Search .......... 56/11.3–11.6, 56/DIG. 22; 474/111, 133–135
See application file for complete search history.

(56) References Cited

U.S. PATENT DOCUMENTS

| | | | |
|---|---|---|---|
| 2,285,864 A * | 6/1942 | Jeffrey et al. | 105/105 |
| 3,391,807 A * | 7/1968 | Buschbom | 414/319 |
| 3,460,325 A * | 8/1969 | Musgrave | 56/11.6 |
| 3,543,892 A * | 12/1970 | De Baillie | 192/224.1 |
| 3,587,336 A * | 6/1971 | Peak | 474/89 |
| 3,817,113 A * | 6/1974 | Pfarrwaller | 474/134 |
| 3,817,114 A * | 6/1974 | Klee | 474/110 |
| 3,982,383 A | 9/1976 | Mott | |
| 4,011,709 A | 3/1977 | Mott et al. | |
| 4,038,880 A | 8/1977 | Garrison | |
| 4,068,452 A * | 1/1978 | Schaefer et al. | 56/11.6 |
| 4,191,006 A | 3/1980 | Kerber et al. | |
| 4,231,215 A | 11/1980 | Klas | |
| 4,416,647 A | 11/1983 | White, Jr. | |
| 4,490,965 A * | 1/1985 | Hutchison | 56/11.6 |
| 4,511,348 A * | 4/1985 | Witdoek et al. | 474/109 |
| 5,012,632 A * | 5/1991 | Kuhn et al. | 56/11.6 |
| 5,242,331 A | 9/1993 | Konig | |
| 6,065,274 A | 5/2000 | Laskowski et al. | |
| 6,141,947 A | 11/2000 | Borling | |
| 6,176,071 B1 * | 1/2001 | Thorman et al. | 56/11.6 |
| 6,220,006 B1 | 4/2001 | Borling | |
| 6,264,578 B1 * | 7/2001 | Ayukawa | 474/135 |
| 6,312,352 B1 | 11/2001 | Holland et al. | |
| 6,484,482 B2 | 11/2002 | Borling | |
| 6,602,155 B2 * | 8/2003 | Buss et al. | 474/135 |
| 7,367,908 B2 * | 5/2008 | Lemberger et al. | 474/138 |
| 7,678,000 B2 * | 3/2010 | Harnetiaux et al. | 474/117 |
| 2001/0029729 A1 | 10/2001 | Borling | |
| 2002/0039942 A1 * | 4/2002 | Liu et al. | 474/133 |
| 2004/0134176 A1 | 7/2004 | Stineman | |

* cited by examiner

*Primary Examiner* — Thomas B Will
*Assistant Examiner* — Mai Nguyen
(74) *Attorney, Agent, or Firm* — Wegman, Hessler & Vanderburg

(57) ABSTRACT

A pulley/belt drive system attached to a mower deck has a belt tensioning mechanism for maintaining tension in an endless belt. The belt tensioning mechanism includes an idler arm pivotally mounted with respect to the mower deck such that the idler arm pivots about an idler arm pivot. A back-side idler pulley engaging a back-side portion of the belt and an inside idler pulley engaging an inside portion of the primary belt are rotatably mounted onto the idler arm. A belt tensioning device is attached to the idler arm to pivot the idler arm, wherein the back-side idler pulley and the inside idler pulley remain in a fixed orientation with respect to each other when the idler arm is pivoted.

4 Claims, 4 Drawing Sheets

TWO-PULLEY BELT TENSIONING MECHANISM

CROSS REFERENCE TO RELATED APPLICATION

This application claims the priority benefit of U.S. Provisional Patent Application Ser. No. 60/933,740 filed Jun. 8, 2007.

BACKGROUND OF THE INVENTION

1. Field of Invention

This invention relates to the field of lawnmowers and, more specifically, to a belt tensioning assembly for use on a rotary mower deck.

2. Description of Related Art

Vehicles such as lawn and garden tractors are often adapted to carry and operate implements such as mower decks which require rotary drive input. To drive the blade or blades of a mower deck, a pulley and belt drive arrangement is commonly provided in which a pulley is coupled with a crankshaft on the vehicle's engine. A V-belt is entrained around the crankshaft pulley as well as a pulley which is operably coupled to the spindles of the mower implement. Problems are commonly associated with conventional drive systems and include slipping or other undesired movement of the belt on the pulleys or the inability to obtain a desired tension in the belt, especially as the mower deck moves relative to the chassis of the mower.

Pulley/belt drive systems are typically tensioned using a back-side idler on the "slack-side" between the last (if more than one) driven pulley and the drive pulley or an inside (typically V-groove) idler. The back-side idler pulley arrangement typically enhances the drive system performance since "belt-wrap" on the drive and driven pulleys is typically increased. However, this arrangement does not function well with drive and driven pulley offsets in the lateral plane exceeding the pulley width or angularities approaching or exceeding 5 degrees since the belt will tend to ride-off the drive or driven pulleys. Inside pulley arrangements typically reduce performance since "belt-wrap" for the drive and driven pulleys is typically decreased.

This invention provides a method and apparatus for providing tension to the belt of a lawn tractor equipped with a mower deck. The difficulties inherent in the related art are overcome in a way that is simple and efficient, while providing better and more advantageous overall results.

SUMMARY OF THE INVENTION

The invention is directed to a pulley/belt drive system attached to a mower deck including a belt tensioning mechanism for maintaining tension in an endless belt. The belt tensioning mechanism includes an idler arm pivotally mounted with respect to the mower deck such that the idler arm pivots about an idler arm pivot. A back-side idler pulley engaging a back-side portion of the belt and an inside idler pulley engaging an inside portion of the primary belt are rotatably mounted onto the idler arm. A belt tensioning device is attached to the idler arm to pivot the idler arm, wherein the back-side idler pulley and the inside idler pulley remain in a fixed orientation with respect to each other when the idler arm is pivoted.

In one aspect of the invention, the back-side idler pulley and the inside idler pulley are positioned on the idler arm such that the angle α formed by the pivot axes of the back-side idler pulley, the idler arm and the inside idler puller is between about 75 to 115 degrees. In another aspect of the invention, the distance A from the pivot axis of the inside idler pulley to the pivot axis of the idler arm is between about 40 to 60% of the distance B between the axis of the back-side idler pulley to the axis of the pivot arm.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
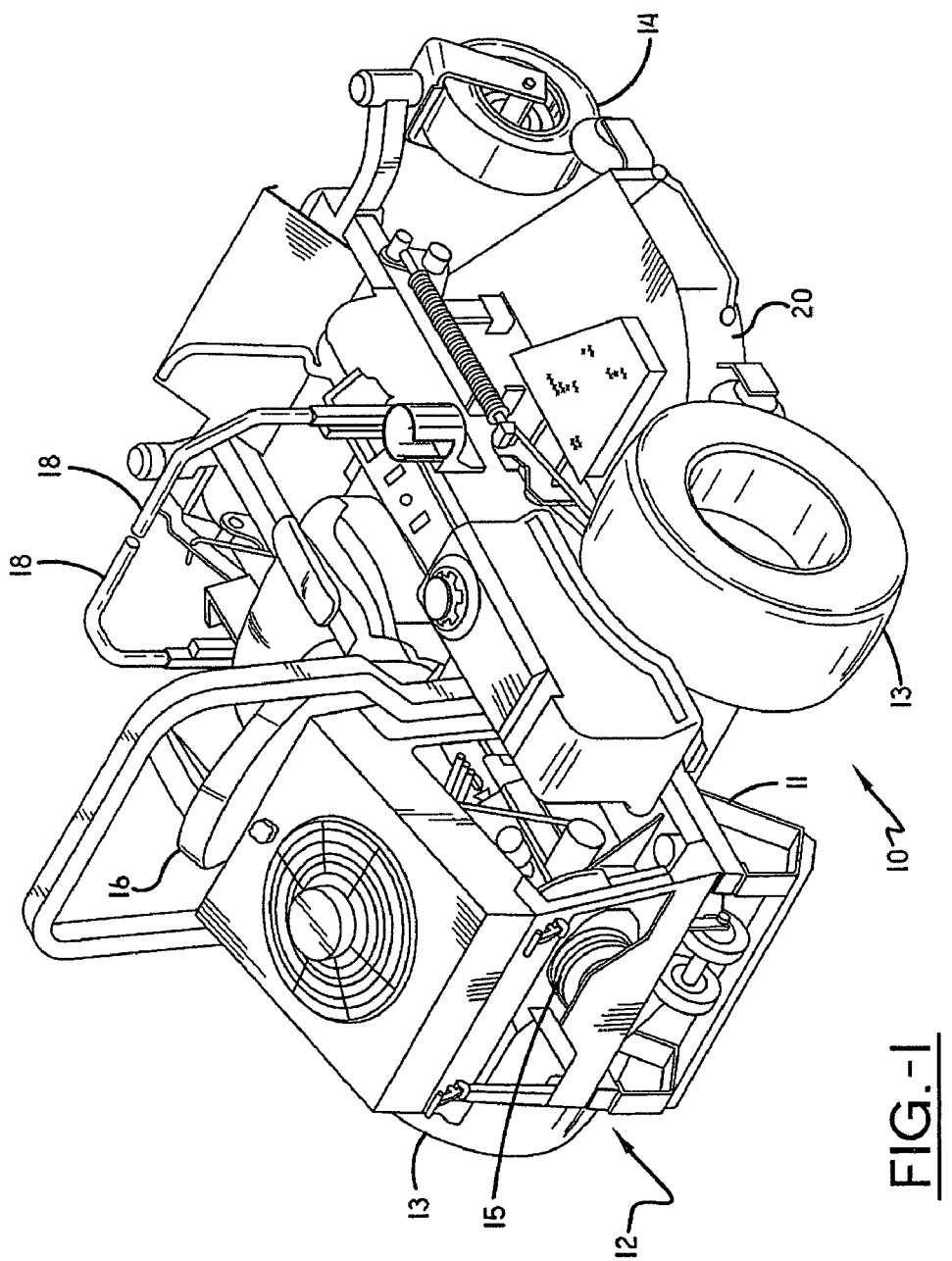
FIG. 1 is perspective view of a lawnmower.

Referring now to the drawings, FIG. 1 shows a lawn tractor 10 equipped with a chassis 11, first and second rear ground engaging wheels 13, and first and second front ground engaging wheels 14. The rear ground engaging wheels 13 may be first and second rear drive wheels for use in providing locomotion for the vehicle. The lawn tractor 10 also includes an engine 15, which may be of any type and configuration, for use in transferring power to drive the rear ground engaging wheels 13. An operator seat 16 and steering levers 18 are provided to allow the operator to selectively steer the lawn tractor 10 as desired. It is noted that any manner of steering and driving the lawn tractor 10 may be chosen with sound engineering judgment, including but not limited to Zero Radius Turning lawn tractors. A mower deck 20 is operatively connected to chassis 11 in a manner well known in the art. The engine 15 also is configured to provide power to drivingly engage at least one cutting blade (not shown) housed within the mower deck 20. The cutting blades are used to sever or cut vegetation as is well known in the art.

Figure 2:
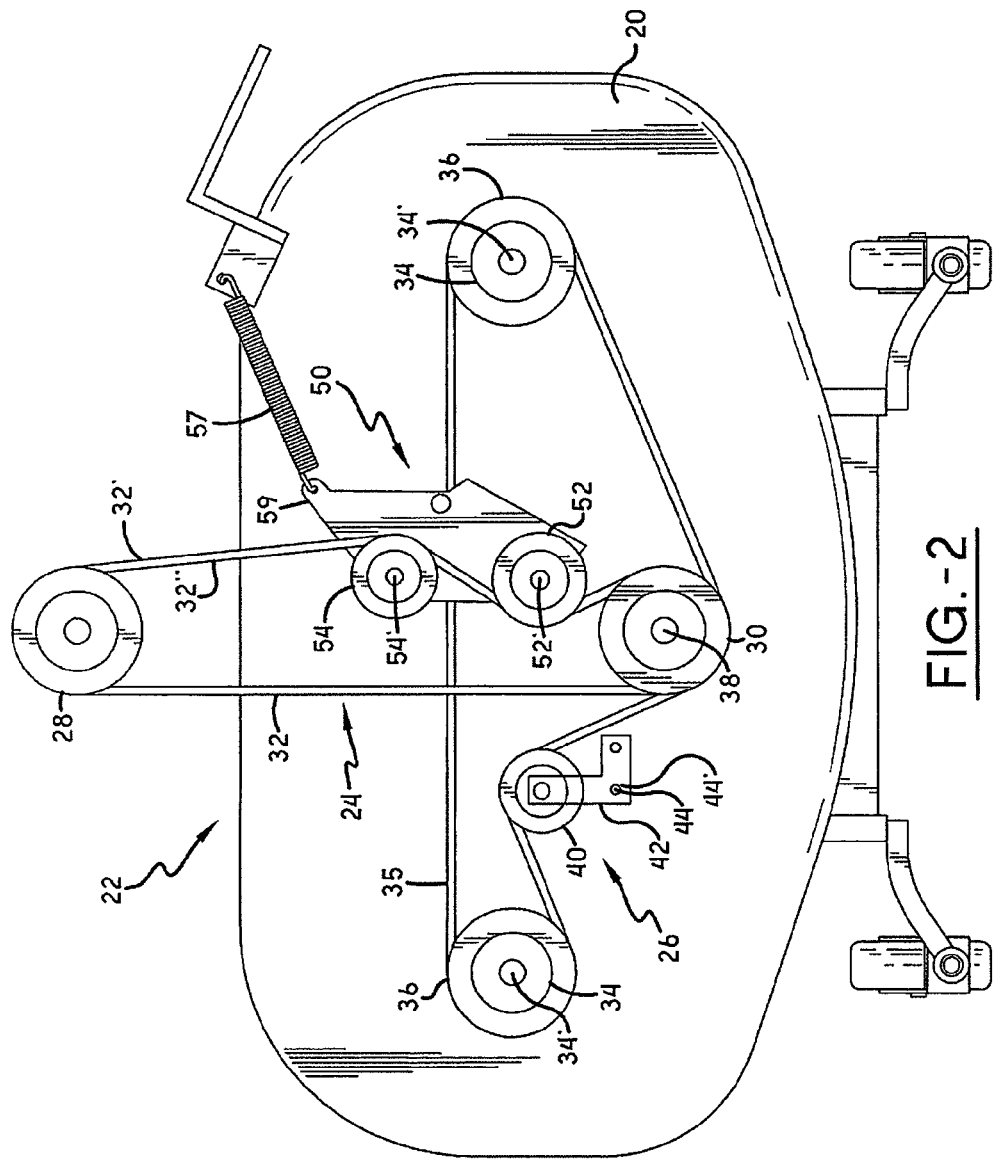
FIG. 2 is a schematic view of the mower deck of the lawnmower of FIG. 1 with a two pulley belt tensioning mechanism according to an embodiment of the invention.

With reference now to FIG. 2, a pulley/belt drive system 22 mounted with the mower deck 20 is used to transmit rotational power from the engine 15 (FIG. 1) to the mower blades (not shown). In the illustrated embodiment, the pulley/belt drive system 22 includes a primary drive assembly 24 and a secondary drive assembly 26. The primary drive assembly 24 includes a drive or PTO pulley 28, a driven double stacked pulley 30, and a primary belt 32. The drive pulley 28 is operatively connected to, and rotated by, the engine 15 in any manner chosen with sound engineering judgment. When power is selectively transferred to the drive pulley 28, the primary belt 32 transfers power to the driven pulley 30.

The secondary drive assembly 26 includes the driven pulley 30, a number of blade spindles 34 rotatably supported on the mower deck 20, and an endless secondary belt 35. In the illustrated embodiment, the secondary drive assembly 26 has two blade spindles 34 supported for rotation about vertical axis 34'. The lower ends of the blade spindles 34 have secured thereto suitable cutting blades (not shown). The upper ends of the blade spindles 34 have blade pulleys 36 secured for rotation therewith. The driven pulley 30 is a double stacked pulley that has first and second pulleys stacked concentrically and selectively rotatable around a pulley bolt 38 as is known in the art. The primary belt 32 is operatively connected to the drive pulley 28 and the first pulley of the double stacked driven pulley 30. Thus, the drive pulley 28 can transmit power via the primary belt 32 to the double stacked driven pulley 30. The secondary belt 35 operatively connects the second pulley of the double stacked driven pulley 30 to the first and second blade pulleys 36. Thus, power can be transmitted from the double stacked driven pulley 30 to the blade spindles 34 thereby rotating the cutting blades. In this manner, sufficient torque is transferred to the cutting blades for severing the desired vegetation.

As is known in the art, the secondary belt 35 engages an idler pulley 40. The idler pulley 40 is rotatably mounted onto pulley arm 42. Pulley arm 42 is attached to the mower deck 20 by pivot 44 and is thereby rotatable about a vertical axis 44' extending generally normal to the plane of the secondary belt 35. A spring (not shown) connects to pulley arm 42 and to the mower deck 20. The spring applies a force on pulley arm 42 to bias the arm in the direction to increase tension on the secondary belt 35, i.e., to rotate the pulley arm in the clockwise direction in FIG. 2.

According to the invention, the primary drive assembly 24 has a two-pulley belt tensioning mechanism 50 for maintaining tension in the primary belt 32. The two-pulley belt tensioning mechanism 50 consists of a back-side idler pulley 52 engaging a back-side portion 32' of the primary belt 32 and an inside idler pulley 54 engaging an inside portion 32" of the primary belt. The back-side idler pulley 52 and the inside idler pulley 54 are both arranged on a common idler arm or bracket 56. The back-side pulley 52 and inside pulley 54 are rotatably mounted onto the idler arm 56 and the idler arm 56 is pivotally mounted with respect to the mower deck 20 such that the two pulleys 52, 54 remain in a fixed orientation with respect to each other when the idler arm 56 is pivoted. Although the invention is shown in an embodiment with the two-pulley belt tensioning mechanism shown in the "slack side" of the primary drive assembly of a pulley/belt drive system, one skilled in the art will understand that the mechanism may be placed in the tension side of a primary drive system or in a pulley/drive belt system that only has a single belt without departing from the scope of the invention.

Figure 3:
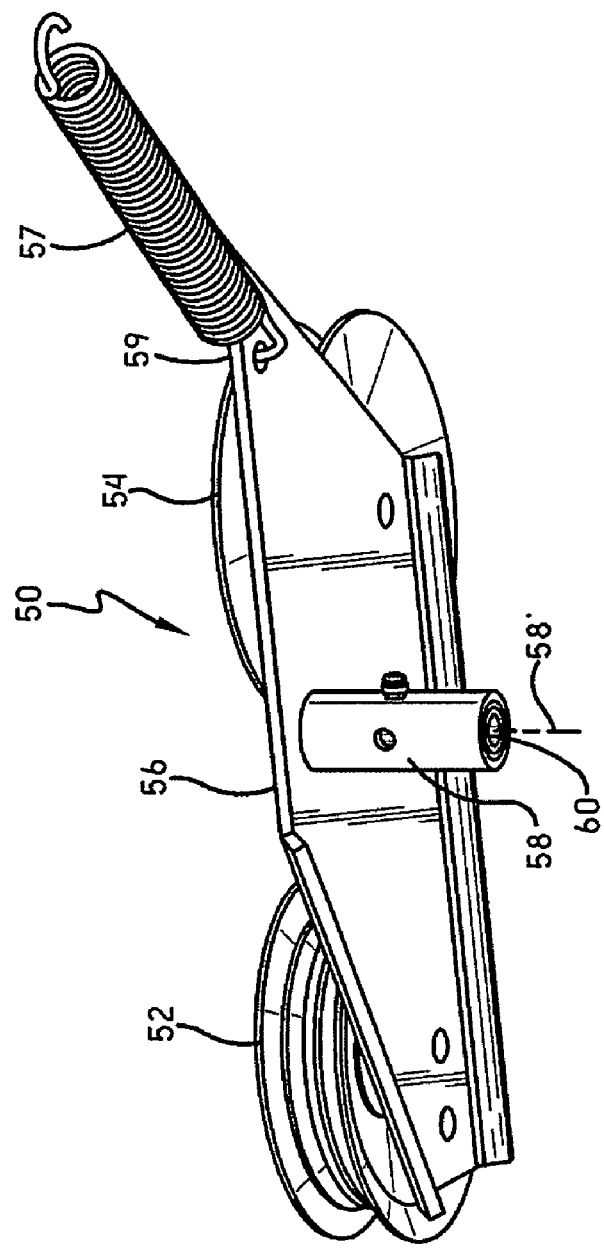
FIG. 3 is a perspective view of the two pulley belt tensioning mechanism of FIG. 2.

As best seen in FIG. 3, the pivoting idler mechanism 50 has a pivot sleeve 58 receiving a suitable bearing 60 to allow pivoting movement of the idler arm 56 about a designated fixed or relocateable axis 58' with respect to the mower deck 20. A belt tensioning device, such as spring 57, is attached to the idler arm 56 at 59. Alternately, the belt tensioning device 57 may be any other air, hydraulic or other operated tension means known to those skilled in the art.

The back-side idler pulley 52 is desirably positioned such that when forced against a "slack-side" of the primary belt 32, it maintains belt tension at a desired level by compensating for extra belt length necessary for belt installation and removal. The back-side idler pulley engages the flat back-side of the primary belt, however, the back-side idler pulley 52 can also be a V-groove type in some circumstances such as the condition where a double-angle V-groove belt is utilized. The back-side idler pulley 52 is positioned to increase the belt wrap of the driven pulley 30 by being positioned in close proximity to the driven pulley 30.

The inside idler pulley 54 desirably maintain alignment of the primary belt 32 as it enters the back-side idler pulley 52 and driven pulley 30. The inside idler pulley 54 is a V-groove type or similar pulley. This pulley 54 also acts to provide belt tension. Additionally, positioning the inside idler pulley 54 adjacent the back-side idler pulley 52 provide a double-acting means to address variations in length of the primary belt 32 due to manufacturing tolerances and/or elongation from usage. The variations in belt length can be more readily addressed due to the double take-up provided by the back-side and inside idler pulleys 52, 54.

The belt tension spring 57 may be a tension, compression, torsion, or other spring that causes the idler arm 56 to pivot such that the back-side idler pulley 52 and inside idler pulley 54 are forced against the primary belt 32, thereby compensating for any extra belt length that would prevent desired belt tension from being achieved. Desirably, the back-side and inside idler pulleys 52, 54 are positioned close to the pivot axis 58' of the idler mechanism 50. This enables belt tension in the primary belt 32 to be maintained at desired force levels with less input force and the input force, via spring 57, acts through longer effective leverage.

Figure 4:
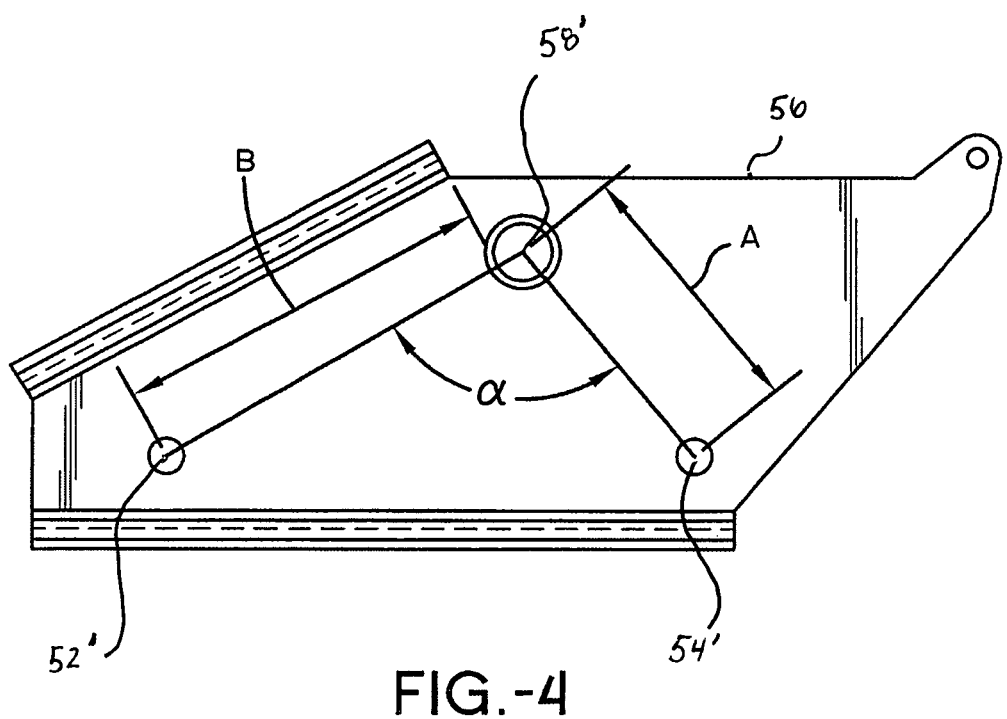
FIG. 4 is a plan view of the two pulley belt tensioning mechanism of FIG. 2.

Referring now to FIG. 4, the inside idler pulley 54 is positioned on the idler arm 56 with respect to the pivot axis 58' such that the angular relationship $\alpha$ of the pivot axis 52' of back-side idler pulley 52 in reference to the pivot axis 54' of the inside idler pulley 54 is from approximately 75 to 115 degrees. Desirably, the distance A from the pivot axis 54' of the inside idler pulley 54 to the pivot axis 58' of the idler arm 58 is between about 40 to 60% of the distance B between the axis 52' of the back-side idler pulley 52 to the axis 58' of the pivot arm 58. One advantage of this configuration is it maximizes belt wrap of the drive and driven pulleys 28, 30. Additionally, the configuration maintains belt alignment between the pulleys 28, 30 even if the lateral offset of the drive and driven pulleys exceeds 5 degrees (i.e. when the mower deck 20 pivots or is adjusted relative to the chassis 11). Such configuration allows for lateral offset between the drive and driven pulley 28, 30 when the mower deck 20 pivots or is adjusted relative to the chassis 11 in excess of ±5 degrees without sacrificing belt wrap and alignment.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A pulley and belt drive system attached to a mower deck of a lawn mower, the pulley and belt drive system including a drive pulley and a driven double stacked pulley connected by an endless belt and a belt tensioning mechanism for maintaining tension in the endless belt, the belt tensioning mechanism comprising:

an idler arm pivotally mounted with respect to the mower deck such that the idler arm pivots about an idler arm pivot;

a back-side idler pulley engaging a back-side portion of the belt rotatably mounted onto the idler arm;

an inside idler pulley engaging an inside portion of the belt rotatably mounted onto the idler arm, wherein the back-side idler pulley is positioned between the inside idler pulley and the driven double stacked pulley such that a point on the endless belt will pass from the drive pulley to the inside idler pulley to the backside idler pulley to the driven pulley and then return to the drive pulley; and a belt tensioning device attached to the idler arm configured to apply a pivoting force on the idler arm to tension said belt;

wherein the back-side idler pulley and the inside idler pulley remain in a fixed orientation with respect to each other when the idler arm is pivoted.

2. The pulley and belt drive system of claim 1 wherein the back-side idler pulley and the inside idler pulley are positioned on the idler arm such that an angle $\alpha$ formed by points on a rotational axis of the back-side idler pulley, the pivot axis of the idler arm pivot, and a rotational axis of the inside idler pulley, with the pivot axis of the idler arm pivot at the vertex of the angle, is between about 75 to 115 degrees.

3. The pulley and belt drive system of claim 1 wherein a distance A from a rotation axis of the inside idler pulley to the pivot axis of the idler arm is between about 40 to 60% of a distance B between a rotation axis of the back-side idler pulley to the pivot axis of the idler arm.

4. The pulley and belt drive system of claim 1 wherein the inside idler pulley is a V-groove type pulley.

* * * * *